United States Patent [19]

Mita et al.

[11] Patent Number: 5,045,674
[45] Date of Patent: Sep. 3, 1991

[54] IC CARD READER/WRITER HAVING ROTATING CONTACT SUPPORT WITH PIN-CHECK VERIFICATION

[75] Inventors: Katsuya Mita, Kyoto; Muneki Morishita, Takatsuki, both of Japan

[73] Assignee: Omron Tateisi Electronics Co., Kyoto, Japan

[21] Appl. No.: 258,885

[22] Filed: Oct. 18, 1988

[30] Foreign Application Priority Data

Oct. 21, 1987 [JP] Japan ................ 62-267456

[51] Int. Cl.⁵ .................... G06K 7/00; G06K 7/06; G06K 13/00; G06K 13/08
[52] U.S. Cl. .................... 235/439; 235/441; 235/475; 235/480
[58] Field of Search ........ 235/375, 441–443, 235/454, 479, 480, 482, 475, 483, 485, 486, 476, 477, 439

[56] References Cited

U.S. PATENT DOCUMENTS

| 4,602,351 | 7/1986 | Shimamura et al. | 235/441 |
| 4,743,746 | 5/1988 | Murschall et al. | 235/441 |
| 4,764,925 | 8/1988 | Grimes et al. | 371/27 |
| 4,851,651 | 7/1989 | Gaucher | 235/475 |

FOREIGN PATENT DOCUMENTS

| 0235022 | 9/1987 | European Pat. Off. |
| 2477303 | 9/1981 | France. |
| 2607290 | 5/1988 | France | 235/486 |

Primary Examiner—Stuart S. Levy
Assistant Examiner—Edward H. Sikorski
Attorney, Agent, or Firm—Dickstein, Shapiro & Morin

[57] ABSTRACT

A first sensor is arranged at a predetermined position on a conveying path of an IC card. When the IC card is detected by the first sensor, the conveyance of the IC card is stopped. A connector supported to a supporting member provided at a predetermined position approaches the contacts of the IC card and comes into contact therewith. There is also provided a second sensor to detect that the connector is located at a position adapted to come into contact with the contacts of the IC card on the basis of the motion of the supporting member. The supporting member has a projecting portion adapted to about on an IC card which has overrun from the predetermined position. When the projecting portion abuts on the IC card, no detection signal is output from the second sensor.

8 Claims, 4 Drawing Sheets

IC CARD READER/WRITER HAVING ROTATING CONTACT SUPPORT WITH PIN-CHECK VERIFICATION

BACKGROUND OF THE INVENTION

The present invention relates to an IC card reader/writer which has a connector with contact members adapted to be come into contact with contacts of an IC card, respectively, and performs transmission and reception of data to/from an electronic circuit (including a CPU) in the IC card through the electrical connection due to the contact between the contacts of the IC card and the contact members of the connector.

As shown in FIG. 5, in a conventional IC card reader/writer, an IC card A inserted to a card inserting port (locating on the right side in FIG. 5) is conveyed through a card conveying path 33 by conveying rollers 31 and 32. A sensor 34 to detect the front edge of the IC card A is arranged at a predetermined position on the card conveying path 33. When the sensor 34 detects the front edge of the IC card A, motors to drive the conveying rollers 31 and 32 are turned off to stop the IC card A at a predetermined position, at the same time, contact members 37 are rotated by an actuator 36 so as to be come into contact with the contacts of the IC card A, and thereafter, a pin check is performed, and if the result of the pin check is OK, card information is read out or written. The pin check is a process to check whether the contacts and the contact members are correctly set in the contact state or not by transmitting and receiving predetermined data between the IC card reader/writer and the IC card through the contact between the contacts and the contact members.

In the case where in spite of the fact that the sensor 34 detected a card, possible errors to be found by the pin check which is executed after that are as follows.

One is that the IC card A has overrun from the predetermined position shown in FIG. 5 and stopped, so that the contact members 37 are deviated from the position of the contacts of the IC card. The second cause is that in spite of the fact that the IC card A has stopped at the proper predetermined position, a defective contact occurs due to dust, fouling or the like.

In the conventional structure shown in FIG. 5, it is impossible to discriminate whether the IC card A has stopped at the proper predetermined position or not, so that it is impossible to decide by which one of the foregoing causes the error occurred and a fault occurs in the error process.

SUMMARY OF THE INVENTION

It is an object of the present invention to provide an IC card reader/writer in which even if a pin check error occurs, the cause thereof can be known.

According to the present invention, this object is accomplished by an IC card reader/writer comprising: a conveying apparatus for conveying an IC card; a first sensor for detecting that the IC card conveyed by the conveying apparatus has reached a predetermined position to read/write, an IC card detection signal of the first sensor serving to stop the conveyance of the IC card by the conveying apparatus; a supporting member which is pivotally supported along a conveying path of the conveying apparatus, the supporting member being provided with a connector having contact members adapted to be come into contact with contacts of the IC card stopped at the predetermined position; a driving apparatus or moving the supporting member between a standby position and a read/write position in response to the IC card detection signal of the first sensor, the contact members of the connector coming into contact with the contacts of the IC card at the read/write position; a second sensor for detecting that the supporting member is moved to the read/write position; and a projecting portion formed on the supporting member, when the supporting member is moved to the read/write position, the projecting portion being projected to the conveying path and abutting on the IC card which has overrun and has been deviated from the predetermined position, thereby blocking the rotation of the supporting member to the read/write position.

According to the invention, when the IC card has reached a predetermined position on the card conveying path, this state is detected by the first sensor to thereby stop the IC card, the supporting member is rotated, the contact members of the connector on the supporting member come into contact with the contacts of the IC card, and when this state is detected by the second sensor, card information can be read out or written under this condition.

On the other hand, when the IC card has overrun and the projecting portion of the supporting member abuts on the IC card, the second sensor does not output a detection signal.

With this structure, the following advantages are obtained.

Whether the IC card has stopped at a predetermined position or not can be accurately discriminated by the presence or absence of the detection output of the second sensor.

When an error occurs in the pin check, it is possible to easily determine whether the cause is based on the overrun of the IC card or the defective contact between the contact members of the connector and the contacts of the IC card.

Hitherto, if a pin check error occurs, both of the retry of the rotation (movement) of the connector and the retry of the conveyance to the predetermined position of the IC card are executed. However, according to the invention, since it is possible to discriminate whether the IC card has been set to the predetermined position or not, if the IC card is located at the predetermined position, it is sufficient to retry only the rotation of the connector. Therefore, the retry time can be reduced.

It is also possible to simultaneously check whether the connector has been moved to the correct operative position (read/write position) or not.

DETAILED DESCRIPTION OF PREFERRED EMBODIMENTS

An embodiment of the present invention will be described hereinbelow with reference to the drawings.

Figure 1:
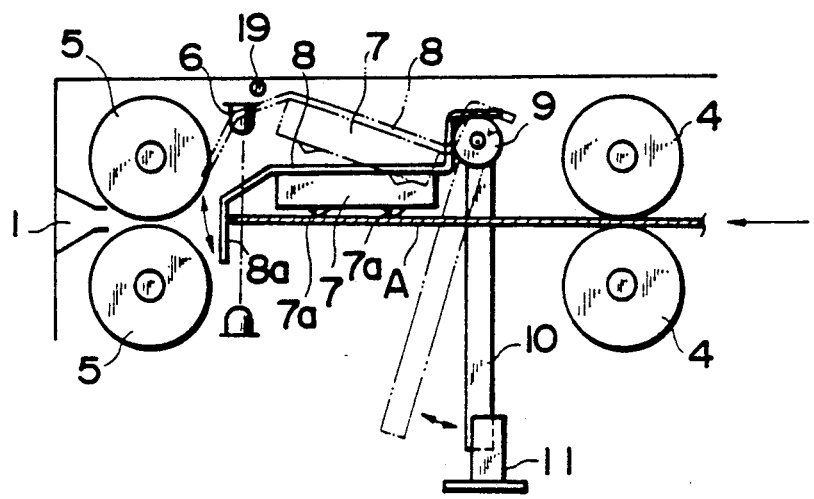
Fig. 1 is a constructional diagram of a part of an IC card reader/writer according to an embodiment of the present invention.
Figure 2:
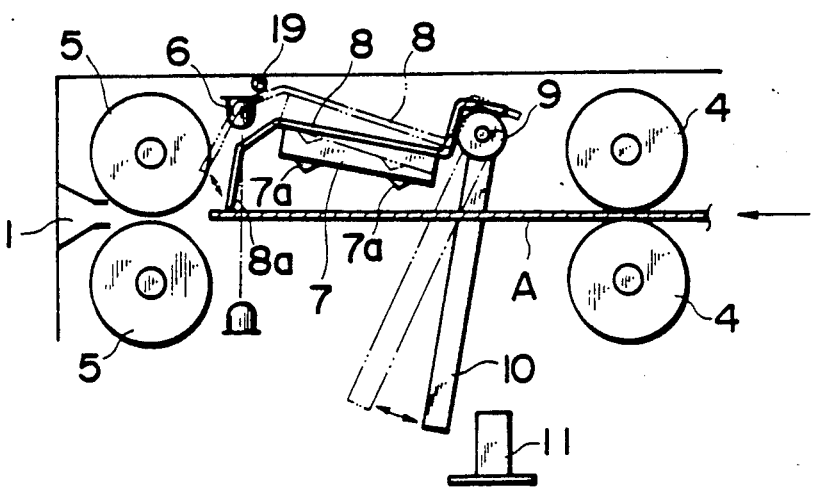
FIG. 2 is an explanatory diagram showing an overrun state of an IC card.

In an IC card reader/writer shown in FIGS. 1 and 2, an IC card A is inserted from the right side of the drawing. The IC card A is conveyed toward a card outlet port 1 on the left side of the drawing by a card conveying apparatus.

The card conveying apparatus comprises: a pair of vertically arranged conveying rollers 4; another pair of vertically arranged conveying rollers 5; and conveying belts (not shown) reeved around the roller pairs 4 and 5. The card conveying apparatus is driven by a motor 3 (refer to FIG. 3). A first sensor 6 to detect the front edge of the IC card A is arranged at a predetermined position on a card conveying path of the card conveying apparatus.

The motor 3 is turned off by an ON signal (a card detection signal) of the first sensor 6 and the IC card A is stopped at the predetermined position of the card conveying path and, at the same time, a connector 7, which will be explained hereinafter, is rotated to an operative position (a read/writer position).

The connector 7 has contact members 7a adapted to come into contact with contacts of the IC card A. The connector 7 is fixed to a pivotal supporting member 8. A base portion of the supporting member 8 is fixed to a rotating shaft 9 which is rotatably supported. When the rotating shaft 9 is rotated by an actuator 13 shown in FIG. 3 in response to a detection output of the first sensor 6, the connector 7 is moved from a position (idle position, standby position) indicated by an alternate long and short dash line in FIG. 1 to a position (operative position, read/write position) shown by a solid line.

The front edge of the supporting member 8 is bent to thereby form an almost L-shaped projecting portion 8a. Only when the IC card A stops at a predetermined position as shown in FIG. 1, can the projecting portion 8a protrude into the conveying path by the descending motion of the supporting member 8. On the other hand, when the IC card A has overrun as shown in FIG. 2, the projecting portion 8a abuts on the upper surface of the IC card A, so that the rotation of the supporting member 8 and connector 7 is blocked.

A lever 10 is further attached to the rotating shaft 9 so as to be rotated integrally with the rotating shaft 9. A second sensor 11 which is turned on or off by the lever 10 is also provided. When the supporting member 8 rotates to the read/write position in a state in which the IC card A stops at the predetermined position, the lever 10 turns on the second sensor 11 as shown in FIG. 1. When the IC card A has overrun as shown in FIG. 2 and the rotation of the supporting member 8 is blocked, the second sensor 11 is held in the off state.

A stopper 19 is provided to set the upper limit position of the supporting member 8.

Figure 3:
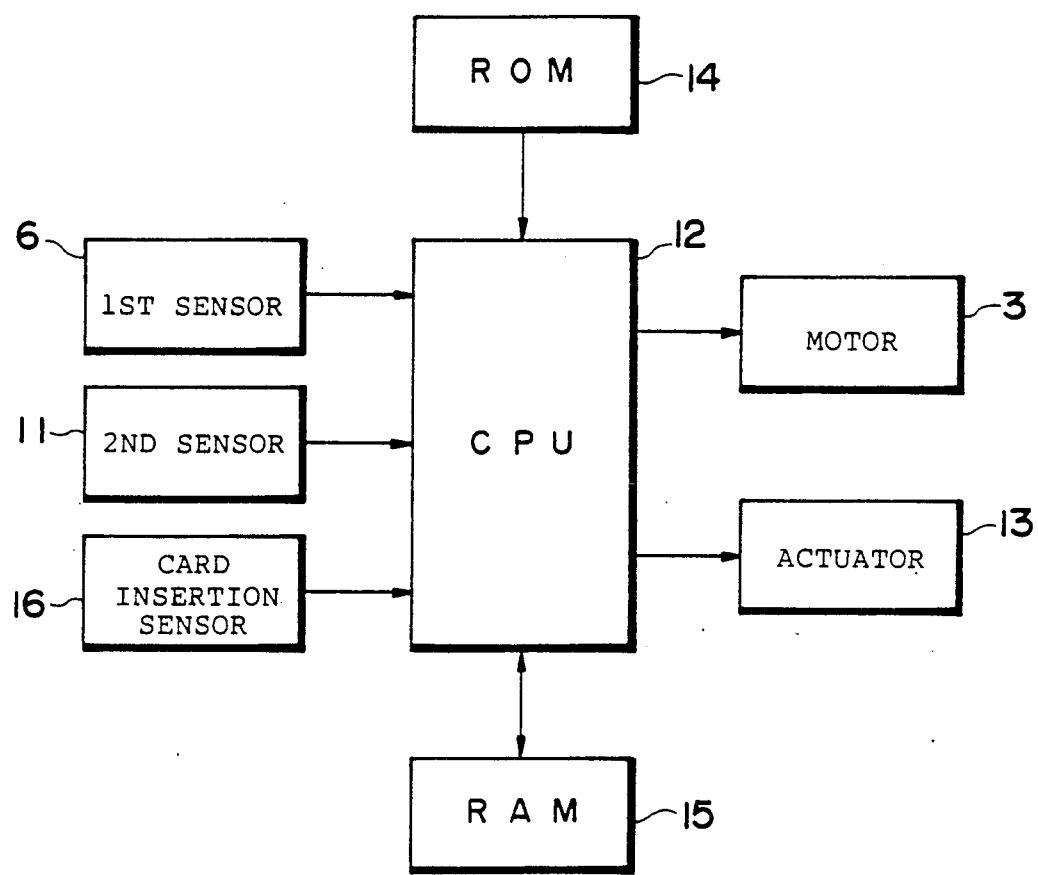
FIG. 3 is a block diagram showing a control circuit.

FIG. 3 shows a control circuit of the IC card reader/writer. A CPU 12 drives the motor 3 and actuator 13 in accordance with a program stored in an ROM 14 on the basis of input signals from the first and second sensors 6 and 11 and a card insertion detecting sensor 16 arranged at the card inserting port. The CPU 12 also allows necessary data to be recorded into an RAM 15.

Figure 4:
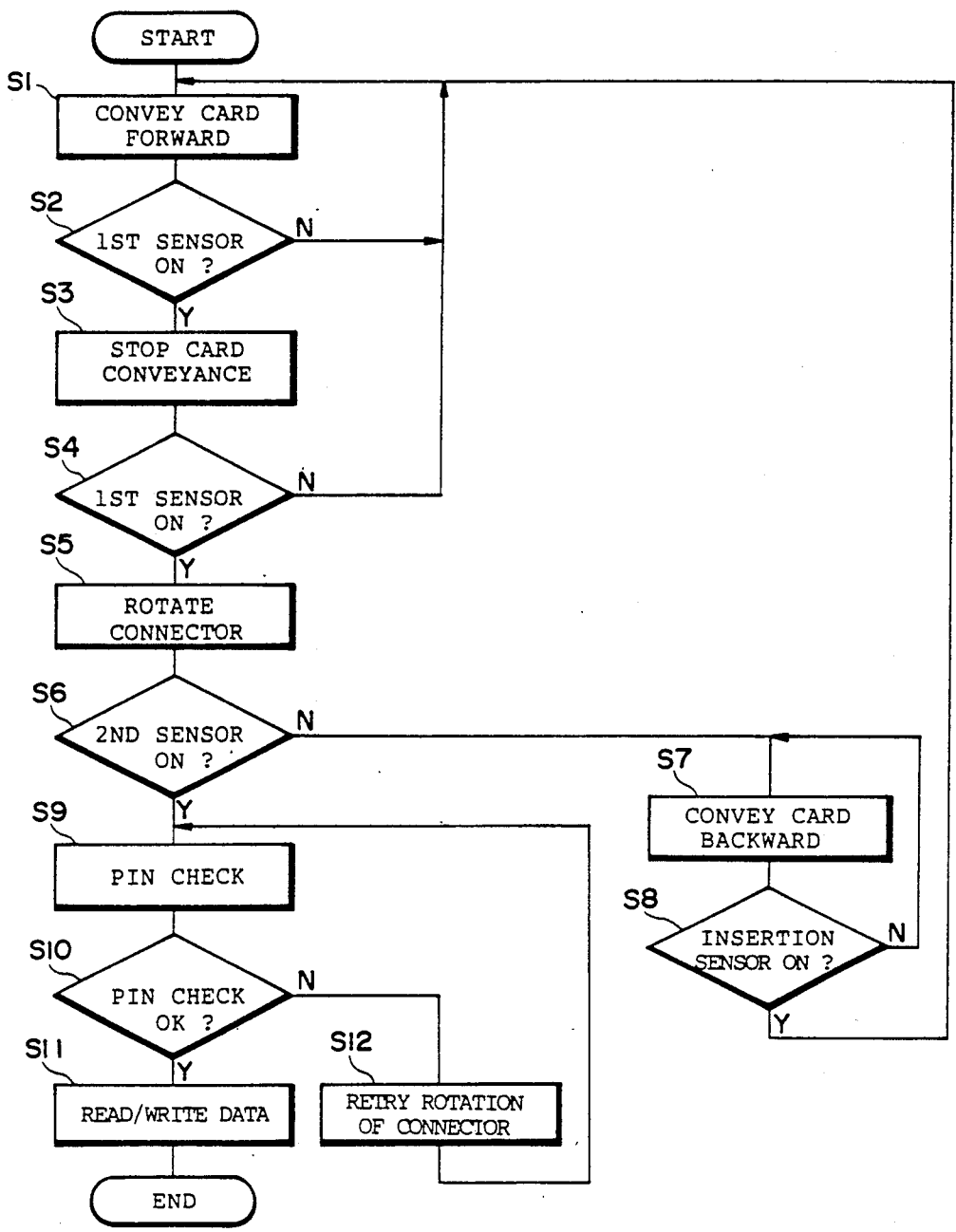
FIG. 4 is a flowchart showing the operation.
Figure 5:
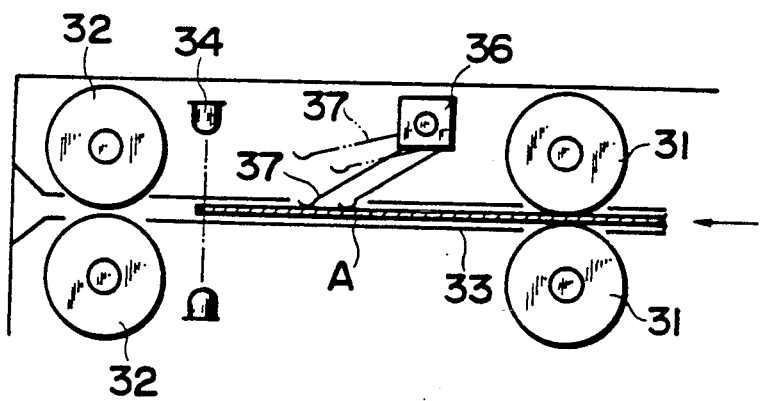
FIG. 5 is a constructional diagram of a conventional IC card reader/writer.

The operation of the IC card reader/writer with the foregoing construction will now be described with reference to a flowchart of FIG. 4.

When the IC card inserted to the card inserting port is detected by the card insertion detecting sensor 16, the motor 3 is forwardly rotated, so that the inserted IC card A is conveyed by the conveying apparatus from the right side toward the left side in FIGS. 1 and 2 (step S1). When the IC card A has reached the predetermined position and is detected by the first sensor 6, the motor 3 is turned off and the conveyance of the IC card A is stopped (steps S2 and S3).

If the IC card A is not reversed but remains at the predetermined position, the actuator 13 is made operative, so that the supporting member 8 is rotated and the connector 7 descends (steps S4 and S5).

However, if the IC card A has overrun as shown in FIG. 2, since the rotation of the supporting member 8 is blocked during the rotation, the second sensor 11 is not turned on. In this case, the IC card A is then conveyed backward to perform a retry of the conveyance of the card to the predetermined position, and when this backward conveyance of the IC card is detected by the sensor 16 arranged near the card inserting port, the processing routine is returned to step S1 (steps S6, S7 and S8).

On the other hand, when the IC card A is located at the predetermined position, since the rotation of the supporting member 8 is not obstructed during the rotation as shown in FIG. 1, the second sensor 11 is turned on. The contact members 7a of the connector 7 are in contact with the contacts of the IC card. A pin check is performed. If the result of the pin check is OK, card information is read out or written and the processing routine is finished (steps S6, S9, S10 and S11).

However, if a pin check error occurs (when a defective rotation of the connector 7 occurs or a defective contact between the contact members 7a of the connector 7 and the contacts of the IC card occurs although the card is located at the predetermined position), the retry of the rotation is executed (step S12).

In this manner, whether the IC card A has stopped at the predetermined position or has overrun, this position can be discriminated by checking to see if the second sensor 11 is turned on or off. Therefore, if the result of the subsequent pin check is not OK, it is possible to determine with certainty whether the cause of the pin check error is based on the overrun of the IC card or the defective contact of the connector. Thus, the subsequent error process can be easily performed.

The card outlet port 1 may be also used as a card inserting port. In this case, the IC card inserted from the inserting port 1 is conveyed to the right side in FIG. 1 or 2. After the IC card was conveyed to a proper position, it is conveyed to the left side. When the front edge of the IC card is detected by the first sensor 6, the processes in step S2 and subsequent steps in FIG. 4 are executed. Since the projecting portion 8a of the supporting member 8 enters the conveying path, the projecting portion 8a functions as a shutter of the inserting port 1.

What is claimed is:

1. An IC card reader/writer comprising:
   a conveying means for conveying an IC card;
   a position sensor for detecting that an IC card conveyed by said conveying means has reached a predetermined position;
   a movable supporting member which is supported along a conveying path of said conveying means, said supporting member being provided with a connector having contact members adapted to come into contact with contacts of the IC card upon movement of said supporting member to a read/write position;
   a driving means for moving said supporting member between a standby position at which said contact members do not make contact with said contacts and said read/write position at which said contact members make contact with said contacts;
a state sensor means for detecting that said supporting member has been moved to said read/write position;
a pin check means for checking whether said contact members have properly come into contact with said contacts of the IC card and for generating a first signal indicating no error when proper contact is made or a second signal indicating an error when proper contact is made;
a first control means for controlling said conveying means to cause an IC card carried by said conveying means to stop at said predetermined position in response to a signal from said position sensor and to reposition the IC card at said predetermined position in response to a signal from said state sensor means indicating said supporting member is not in the read/write position after said supporting member has been moved toward said read/write position; and
a second control means for controlling said driving means to move said supporting member from said standby position to said read/write position in response to said signal from said position sensor and to again try moving said supporting member to said read/write position in response to a signal from said state sensor means indicating that said supporting member is in the read/write position and said second signal representing that an error has occurred.

2. An IC card reader/writer as in claim 1 further comprising means for reading/writing data in response to said first signal from said pin check means.

3. An IC card reader/writer as in claim 1 wherein said state sensor includes a first stationary member and a second movable member which moves relative to said first stationary member together with movement of said support member.

4. An IC card reader/writer as in claim 1 wherein said supporting means includes a projecting portion formed thereon which, when said supporting member is moved to the read/write position, projects into said conveying path, said projecting portion abutting against a conveyed IC card which has overrun past said predetermined position, thereby blocking movement of said supporting member to said read/write position.

5. An IC card reader/writer according to claim 4, wherein said supporting member is arranged near a card inserting port and said projecting portion functions as a shutter to close said inserting port.

6. An IC card reader/writer as in claim 5 wherein said card insertion port is also an exit port for said IC card.

7. An IC card reader/writer as in claim 4 wherein said support member moves about a pivot point and said projection is integrally formed with said support member.

8. An IC card reader/writer as in claim 7 wherein said state sensor includes a first stationary member and a second movable member which moves relative to said first stationary member together with movement of said support member.

* * * * *